United States Patent
Patwardhan et al.

(10) Patent No.: US 11,088,934 B2
(45) Date of Patent: Aug. 10, 2021

(54) DYNAMIC DISCOVERY OF SERVICE NODES IN A NETWORK

(71) Applicant: Cisco Technology, Inc., San Jose, CA (US)

(72) Inventors: Sourabh Suresh Patwardhan, Milpitas, CA (US); Naga Venkata Kiran Kumar Chunduri, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 68 days.

(21) Appl. No.: 16/598,919

(22) Filed: Oct. 10, 2019

(65) Prior Publication Data

US 2021/0111984 A1 Apr. 15, 2021

(51) Int. Cl.
*H04L 12/751* (2013.01)
*H04L 29/08* (2006.01)

(52) U.S. Cl.
CPC ............ *H04L 45/02* (2013.01); *H04L 69/324* (2013.01)

(58) Field of Classification Search
None
See application file for complete search history.

(56) References Cited

U.S. PATENT DOCUMENTS

| | | |
|---|---|---|
| 8,693,374 B1 | 4/2014 | Murphy et al. |
| 8,711,855 B1 | 4/2014 | Murphy et al. |
| 9,100,285 B1 | 8/2015 | Choudhury et al. |
| 9,350,661 B2 | 5/2016 | Murphy et al. |
| 9,413,602 B2 | 8/2016 | Mohandas et al. |
| 9,433,081 B1 | 8/2016 | Xiong et al. |
| 9,596,169 B2 | 3/2017 | Choudhury et al. |
| 9,655,232 B2 | 5/2017 | Saxena et al. |
| 9,729,948 B1 * | 8/2017 | Subrahmaniam .. H04Q 11/0005 |
| 9,900,217 B2 | 2/2018 | Gourlay et al. |
| 9,979,595 B2 | 5/2018 | Choudhury et al. |
| 10,182,496 B2 | 1/2019 | Saxena et al. |
| 2014/0105029 A1 * | 4/2014 | Jain ..................... H04L 43/0811 370/242 |
| 2015/0098320 A1 * | 4/2015 | Natarajan ............... H04L 45/74 370/230 |

(Continued)

FOREIGN PATENT DOCUMENTS

| | | |
|---|---|---|
| CN | 103873366 A | 6/2014 |
| CN | 103873378 A | 6/2014 |

(Continued)

OTHER PUBLICATIONS

Ochao-Aday, et al., "eTDP: Enhanced Topology Discovery Protocol for Software-Defined Networks," IEEE Access, vol. 7, Feb. 15, 2019, pp. 23471-23487.

(Continued)

*Primary Examiner* — Eunsook Choi
(74) *Attorney, Agent, or Firm* — Lee & Hayes, P.C.

(57) ABSTRACT

This disclosure describes various methods, systems, and devices related to dynamic service node discovery in a network. In an example method, an intermediary node receives a Link Layer Discovery Protocol (LLDP) message from a first node. The LLDP message includes a discovery Type-Length-Value (TLV) that indicates a location of a service node in the network. The method further includes forwarding the LLDP message to a second node.

20 Claims, 11 Drawing Sheets

(56) References Cited

U.S. PATENT DOCUMENTS

| 2018/0131569 | A1 | 5/2018 | Gourlay et al. |
| 2019/0190851 | A1 | 6/2019 | Hsu et al. |
| 2020/0026339 | A1* | 1/2020 | Sebastian ............... G06F 1/3209 |
| 2020/0044940 | A1* | 2/2020 | Thomasson ............ H04L 41/085 |
| 2020/0112523 | A1* | 4/2020 | Song ................... H04L 47/6275 |
| 2020/0162586 | A1* | 5/2020 | Li ............................ H04L 69/08 |
| 2020/0314144 | A1* | 10/2020 | Ga L ..................... H04L 9/3247 |

FOREIGN PATENT DOCUMENTS

| EP | 2747354 A1 | 6/2014 |
| EP | 2747355 A1 | 6/2014 |
| EP | 2852094 A1 | 3/2015 |
| EP | 2953301 A1 | 12/2015 |

OTHER PUBLICATIONS

PCT Search Report and Written Opinion dated Nov. 30, 2020 for PCT Application No. PCT/US20/54861, 12 pages.

\* cited by examiner

DISCOVERY
TLV
400

| Type | Length | Value |
|---|---|---|
| TLV Type 402 | TLV Length 404 | Service Node Identifier 406 |
| | | Service Node Location 408 |
| | | Service Node Type 410 |
| | | Service Node Capability 412 |

FIG. 4A

DISCOVERY
TLV
414

| Type | Length | Unique Identifier | Subtype | Information String |
|---|---|---|---|---|
| TLV Type 416 | TLV Length 418 | Identifier 420 | Subtype 422 | Service Node Identifier 424 |
| | | | | Service Node Location 426 |
| | | | | Service Node Type 428 |
| | | | | Service Node Capability 430 |

FIG. 4B

HOPCOUNT
TLV
500

| Type | Length | Value |
|---|---|---|
| TLV Type 502 | TLV Length 504 | Counter 506 |

FIG. 5A

HOPCOUNT
TLV
508

| Type | Length | Unique Identifier | Subtype | Information String |
|---|---|---|---|---|
| TLV Type 510 | TLV Length 512 | Identifier 514 | Subtype 516 | Counter 518 |

FIG. 5B

DYNAMIC DISCOVERY OF SERVICE NODES IN A NETWORK

TECHNICAL FIELD

The present disclosure relates generally to generating messages that can be used to notify devices in a network that a service node is connected to a network, as well as to dynamically discovering and monitoring service nodes in a network.

BACKGROUND

Various network topologies are designed to be efficient, scalable, and enable fast communication between various network devices. In some cases, these network topologies can be applied to data center environments. Devices in many modern data center environments are arranged according to a spine-leaf configuration. A spine-leaf network can include two layers: a spine layer and a leaf layer. The spine layer can include one or more top-tier switches. The leaf layer can include multiple lower-tier switches connected to the top-tier switches in a fully interconnected mesh topology. The lower-tier switches can be connected to host servers with various computer resources that can be utilized for various purposes, such as to host tenants, host Virtual Machines (VMs), store data, perform computations, and the like. Due to the interconnectivity within the spine layer and the leaf layer, data packets transmitted between devices within the network are transmitted through the same number of nodes and interfaces. Accordingly, data traffic can travel with a consistent speed and latency through a spine-leaf network.

Computing resources of host servers can be controlled and managed by a central controller connected to the spine-leaf network. The central controller can be a software-defined network controller that can manage, configure, and enable communication between devices in the network. For instance, the central controller may manage the lower-tier switches and top-tier switches within the spine-leaf network and may also enable communication between host servers connected to the lower-tier switches.

When a new host server joins the network, the central controller must discover the server before it can manage the resources in the host server and enable communication to and from the host server. In various networks, a lower-tier switch can transmit Link Layer Discovery Protocol (LLDP) messages toward host servers connected to the lower-tier switch. Once the host servers receive the LLDP messages, the host servers may be aware of the lower-tier switch. The host servers, however, may be unable to directly communicate with the central controller. Accordingly, some networks require an additional resource controller to receive messages from the host servers indicating their connectivity, and the network controller may have to separately query the resource controller to separately report the connectivity of the host servers to the network controller. In addition, LLDP messages are generally designed to only travel a single hop in a network. Accordingly, if any nodes are present between a lower-tier switch and a host server, the host server may be unable to receive an LLDP message directly from its closest lower-tier switch.

DESCRIPTION OF THE FIGURES

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 4A illustrates an example of a discovery Type-Length-Value (TLV) in an LLDP message that is generated by a service node.

FIG. 4B illustrates another example of a discovery TLV in an LLDP message that is generated by a service node FIG. 5A illustrates an example of a hopcount TLV in an LLDP message that is generated by a service node.

FIG. 5B illustrates another example of a hopcount TLV in an LLDP message that is generated by a service node.

DETAILED DESCRIPTION

Overview

Figure 1:
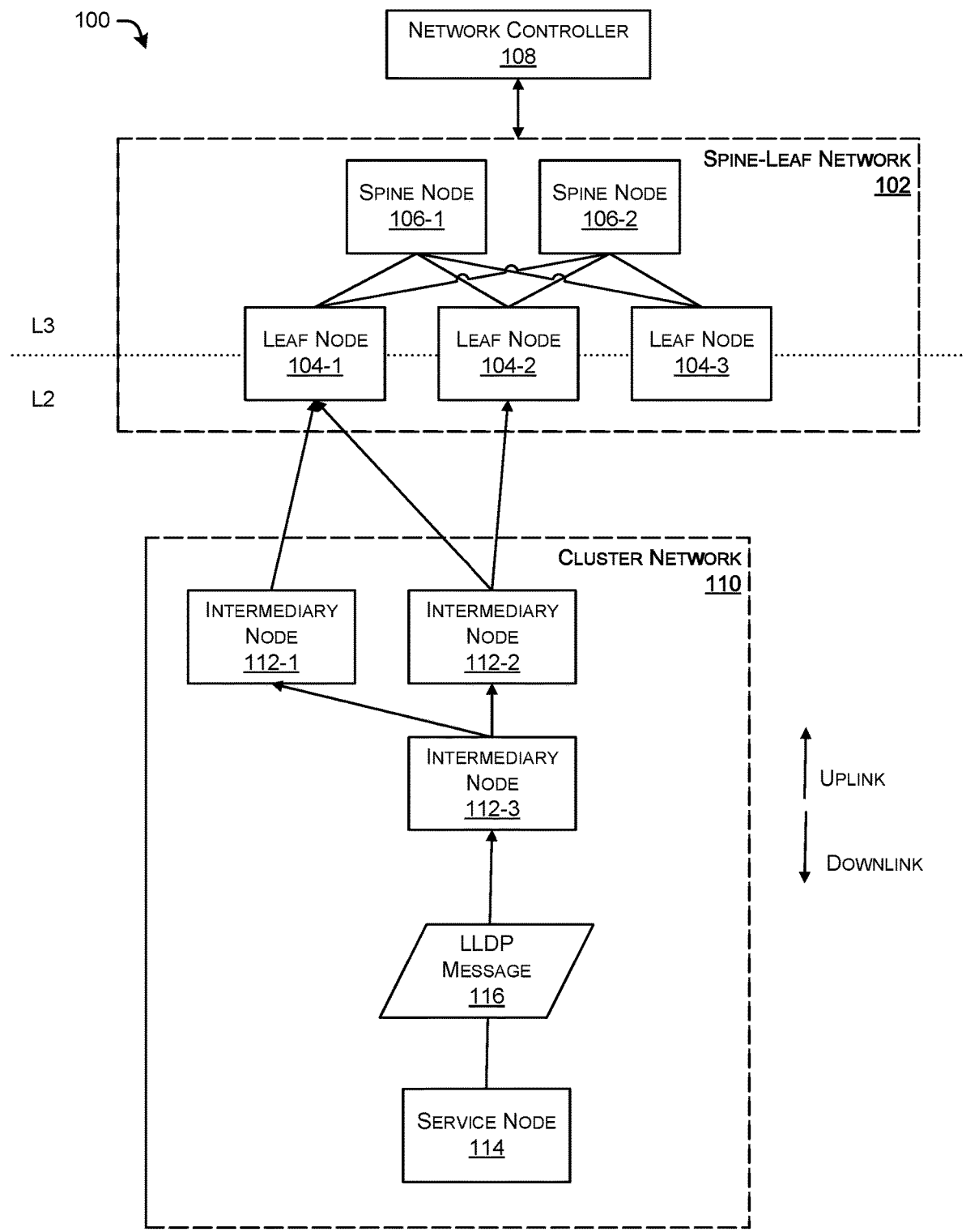
FIG. 1 illustrates an example environment for implementing service node discovery and monitoring.

Various implementations of the present disclosure relate to service node-generated Link Layer Discovery Protocol (LLDP) messages for dynamic discovery of service nodes in a network. Particular implementations enable dynamic discovery of the service nodes by a network controller associated with a spine-leaf network, without the assistance of a third-party resource controller.

In example implementations, the LLDP messages are generated, relayed, and/or received by network devices. These network devices can include servers, switches, or the like. In various implementations, the techniques described herein may be performed by a system and/or device having non-transitory computer-readable media storing computer-executable instructions that, when executed by one or more processors, performs the methods described herein.

Example Embodiments

In particular implementations, a service node is configured to generate and transmit an LLDP message. The LLDP message may include a "discovery" Type-Length-Value (TLV), which can identify the service node, indicate how the service node is connected to the network, specify capabilities of the service node, or the like. When the LLDP message is received by a leaf node in a spine-leaf network, the leaf node can advertise the service node to a network controller within the spine-leaf network. Accordingly, the LLDP message can enable the network controller to efficiently identify when the service node connects to the spine-leaf network. In some cases in which the service node periodically transmits the LLDP message, the network controller can also use the LLDP message as a health check to identify whether the service node remains connected to the network.

In certain implementations, one or more intermediary nodes may be present between the service node and the leaf node. These intermediary nodes may be configured to relay LLDP messages from the service node to the leaf node. The LLDP messages may also include a "hopcount" TLV (also referred to as a "RelayHopCount" TLV). A hopcount TLV in a particular LLDP message can specify a counter that can be modified each time an intermediary node relays the LLDP message. When the counter in the hopcount TLV reaches a particular number (e.g., zero), the intermediary node may refrain from relaying the LLDP to another network node. Accordingly, the hopcount TLV may prevent service node-generated LLDP messages from being relayed indefinitely by intermediary nodes.

Implementations of the present disclosure can provide various improvements to computer networks. When a spine-leaf network relies on LLDP messages generated by the leaf nodes toward the service nodes to discover the service nodes, a network controller associated with the spine-leaf network may have to rely on a resource controller to ascertain the presence of the service nodes. The resource controller may be external to the network fabric and/or be managed by a third party. However, in particular implementations described herein, service node-generated LLDP messages can be used to notify leaf nodes of the presence of service nodes in the network, thereby eliminating the need for a resource controller to discover service nodes in the network.

Various implementations of the present disclosure will now be described with reference to the accompanying figures.

FIG. 1 illustrates an example environment 100 for implementing service node discovery and monitoring. As illustrated, the environment includes a spine-leaf network 102. The spine-leaf network includes multiple leaf nodes 104-1 to 104-3 connected to multiple spine nodes 106-1 and 106-2. As used herein, the terms "node," "network node," and their equivalents, can refer to any entity within a network that can transmit packets to and/or receive packets from at least one other node. A node may be a device, a software instance, a Virtual Machine (VM), a network switch, or the like. In some examples, a node can be a client, a server, or a combination thereof. In various examples, each of the multiple leaf nodes 104-1 to 104-3 may be lower-tier network switches, and each of the multiple spine-nodes 106-1 and 106-2 may be upper-tier network switches. As used herein, the term "network switch" can refer to a multiport network bridge configured to receive data, process the data, and selectively forward data to another device connected to the network switch. As used herein, the term "tier" can refer to multiple network nodes that are connected to other nodes within a network but are not directly interconnected to each other. Thus, the leaf nodes 104-1 to 104-3 are part of a tier (e.g., a lower tier or leaf tier) and the spine nodes 106-1 and 106-2 are part of a tier (e.g., an upper tier or a spine tier) within the spine-leaf network 102.

Each one of the leaf nodes 104-1 to 104-3 is connected to every one of the spine nodes 106-1 to 106-2 via network interfaces. As used herein, the terms "interface," "link," and their equivalents, can refer to a connection between two nodes in a network. In some cases, an interface may directly connect the two nodes and/or may omit any interceding nodes. An interface may be connected to a first port of a first device and to a second port of a second device. In some cases, an interface between two nodes can be a wired interface, such that data can be transmitted as a signal conducted through a solid medium (e.g., an Ethernet cable, a fiber-optic cable, etc.) connecting the two nodes. In some examples, an interface between nodes can be a wireless interface, such that a packet can be transmitted as a signal (e.g., electromagnetic waves, ultrasonic waves, etc.) through a fluid medium (e.g., air, water, etc.) connecting the two nodes. An interface (e.g., one of the interfaces between one of the leaf nodes 104-1 to 104-3 and one of the spine nodes 106-1 and 106-2) may interconnect two ports. As used herein, the term "port," and its equivalents, can refer to a hardware and/or software connection between a device or software instance and a communication interface. A given software-based port can be identified according to its port number. Although FIG. 1 illustrates three leaf nodes 104-1 to 104-3 and two spine nodes 106-1 and 106-2, implementations are not so limited. Additional leaf nodes and/or spine nodes can be included in the spine leaf network 104. However, regardless of the number of leaf nodes and/or spine nodes, each leaf node within the spine-leaf network may be directly connected to all of the spine nodes within the spine-leaf network.

In various implementations, a network controller 108 (also referred to as a "network fabric controller," "fabric controller," or equivalent) may be configured to manage communication within the spine-leaf network 102. The network controller 108 may be connected to any of the leaf nodes 104-1 to 104-3 and/or any of the spine nodes 106-1 and 106-2. In various implementations, the network controller 108 and the spine leaf network 102 may be part of an internal network with a common security policy. The network controller 108 may be configured to directly connect any of the nodes within the spine-leaf network 102. The network controller 108 may also be configured to manage at least some elements of cluster networks connected to the leaf nodes 104-1 to 104-3, such as cluster network 110. The internal control 108 may be configured to control various nodes within a datacenter fabric including the spine-leaf network 102 and any nodes connected to the spine-leaf network 102.

Cluster network 110 can include a service node 114 and multiple intermediary nodes 112-1 to 112-3. As used herein, the term "cluster network" can refer to one or more service nodes connected to at least one leaf node in a spine-leaf network. In some examples, such as the cluster network 110 illustrated in FIG. 1, a cluster network can include one or more intermediary nodes interconnecting the service node(s) and the leaf node(s). As used herein, the terms "service node," "extended leaf node," "initiator," and their equivalents, can refer to a network node in a cluster network that is configured to store, generate, and/or process data. According to various implementations, the spine-leaf network 102 and the cluster network 110 can be considered part of the same network or network fabric. In some cases, a service node, such as the service node 114, can include one or more computing resources (e.g., memory, processing capabilities, etc.) that can be used to host a tenant, Virtual Machine (VM), or the like. For instance, a service node can be a server.

As used herein, the terms "intermediary node," "relayer," and their equivalents can refer to a network node in a cluster network that is configured to receive data and transmit data to other nodes in the network. An example of an intermediary node can be a Top of Rack (ToR) switch. In particular implementations, an intermediary node can be connected to a single leaf node. For instance, as illustrated in FIG. 1, a first intermediary node 112-1 is directly connected to a first leaf node 104-1. In certain implementations, an intermediary node can be connected to multiple (e.g., one or two) leaf nodes. For instance, as illustrated in FIG. 1, a second intermediary node 112-2 is connected to both the first leaf node 104-1 and a second leaf node 104-2. An intermediary node can be connected to one or more service nodes. For instance, a third intermediary node 112-3 illustrated in FIG. 1 is connected to the service node 114. In some cases, an intermediary node can be connected to other intermediary nodes. For instance, the third intermediary node 112-3 is connected to both the first intermediary node 112-1 and the second intermediary node 112-2 in an uplink direction. Similarly, each one of the first intermediary node 112-1 and the second intermediary node 112-2 is connected to the third intermediary node 112-3 in a downlink direction. As used herein, the term "uplink" can refer to a direction of interfaces and/or data transmission that extends toward spine nodes in a spine leaf network (e.g., toward the spine nodes 106-1 to 106-2 in the spine-leaf network 102) and that is opposite to a downlink direction. As used herein, the term "downlink" can refer to a direction of interfaces and/or data transmission that extends toward a service node in a cluster network (e.g., toward the service node 114 in the cluster network 110) and that is opposite to an uplink direction.

The intermediary nodes 112-1 to 112-3 may be arranged in one or more tiers in the cluster network 110. For instance, the first and second intermediary nodes 112-1 and 112-2 may be part of a first tier and the third intermediary node 112-3 may be part of a second tier. Although only two tiers of intermediary nodes are illustrated in FIG. 1, in various implementations, greater or fewer tiers may be included in the cluster network 110. In addition, although only three intermediary nodes 112-1 to 112-3 are illustrated in FIG. 1, greater or fewer intermediary nodes can be included in the cluster network 110 in various implementations.

In some implementations, the network controller 108 may be enabled to remotely manage computing resources in the service node 114. However, the network controller 108 may be unable to manage the intermediary nodes 112-1 to 112-3. The cluster network 110 may be an external network. In some cases, although not illustrated in FIG. 1, one or more firewalls may be disposed between the intermediary nodes 112-1 to 112-3 and the leaf nodes 104-1 and 104-2, or within the leaf nodes 110-1 to 110-3 themselves, thereby protecting the internal network from external security threats, such as from the cluster network 110.

The service node 114 may join the cluster network 110 by connecting to at least one of the intermediary nodes in the cluster network 110, such as the third intermediary network 112-3. Once the service node 114 is connected to the cluster network 110, the service node 114 may begin transmitting at least one Link Layer Discovery Protocol (LLDP) message 116 toward the spine-leaf network 102. The LLDP message 116 can be an LLDP frame with one or more custom Type-Length-Value (TLV) fields that enable discovery of the service node 114. For instance, the LLDP message 116 may include a discovery TLV and/or a hopcount TLV, examples of which are described below in further detail with respect to FIGS. 3 to 5B.

In various implementations of the present disclosure, intermediary nodes within the cluster network 110 may receive the LLDP message 116 from the service node 114. For instance, the third intermediary node 112-3 may initially receive the LLDP message 116 transmitted from the service node 114. In general, LLDP messages are only transmitted one hop in a network, i.e., across a single interface from one node to another node. However, in various implementations described herein, the third intermediary node 112-3 may be configured to relay the LLDP message 116 to at least one other node in the network. For instance, the third intermediary node 112-3 may re-transmit the LLDP message 116 to both the first intermediary node 112-1 and the second intermediary node 112-2 in the uplink direction. Similarly, upon receiving the LLDP message 116, the first intermediary node 112-1 and the second intermediary node 112-2 may each relay the LLDP message 116 to another network node in the uplink direction. The LLDP message 116 from the service node 114 may thereby travel through the cluster network 110 and may be received by at least one leaf node in the spine leaf network 102. With reference to FIG. 1, the first leaf node 104-1 may receive the LLDP message 116 from the first intermediary node 112-1 and/or the second intermediary node 112-2 and the second leaf node 104-2 may receive the LLDP message 116 from the second intermediary node 112-2. Accordingly, the first leaf node 104-1 and/or the second leaf node 104-2 in the spine leaf network 102 can identify the presence of the service node 114.

Once the first leaf node 104-1 and/or the second leaf node 104-2 identifies the presence of the service node 114, the first leaf node 104-1 and/or the second leaf node 104-2 may report the presence of the service node 114 to the network controller 108. In various implementations, the first leaf node 104-1 and/or the second leaf node 104-2 may refrain from relaying the LLDP message 116 to other nodes in the spine-leaf network 102. For instance, if the first leaf node 104-1 receives the LLDP message 116, the first leaf node 104-1 may refrain from forwarding the LLDP message 116 to the first spine node 106-1 and the second spine node 106-1. The network controller 108 can therefore manage and/or monitor the service node 114.

The LLDP message 116 can be used for both discovery of the service node 114 as well as for ongoing monitoring of the connectivity of the service node 114. For instance, an initial LLDP message 116 that the service node 114 transmits through the cluster network 110 to the spine-leaf network 102 can be used by the controller 108 to discover the service node 114. Subsequently, the service node 114 may periodically transmit additional LLDP messages 116 through the cluster network 110 to the spine-leaf network 102. These additional LLDP messages 116 can be used by the controller 108 to identify that the service node 114 remains connected to the cluster network 110. If the controller 108 identifies that the periodic LLDP messages 116 are interrupted and/or delayed, the controller 108 may identify that there is an interruption in the connectivity of the cluster network 110 and/or the service node 114. In some cases, the controller 108 may balance a load on the service node 114 to another service node connected to the spine leaf network 102. In certain examples, the controller 108 may notify a user or central administrator that there is a problem with the service node 114.

As illustrated, the environment 100 may be associated with Layer 2 (L2) network devices and Layer 3 (L3) network devices. The elements of the cluster network 110 (e.g., the intermediary nodes 112-1 to 112-3 and the service node 114) may be L2 network devices. For instance, the intermediary nodes 112-1 to 112-3 can include L2 network devices, such as network bridges that are configured to process and forward data at the L2 layer. In some cases, the intermediary nodes 112-1 to 112-3 forward data packets between devices according to hardware addresses, Media Access Control (MAC) addresses, or the like, indicated by the data packets. The elements of the spine-leaf network 102 (e.g., the leaf nodes 104-1 to 104-3 and/or the spine nodes 106-1 to 106-3) may be L3 network devices. In some cases, the elements of the spine-leaf network 102 may support routing functionality. In various implementations, the leaf nodes 104-1 to 104-3 may be multilayer switches configured to interconnect L2 and L3.

According to various implementations of the present disclosure, the network controller 108 may be empowered to directly discover and/or monitor the presence of the service node 114 without separately querying another device (e.g., a resource controller connected to the service node 114). Thus, the network controller 108 may be able to efficiently manage computing resources within the service node 114.

Figure 2:
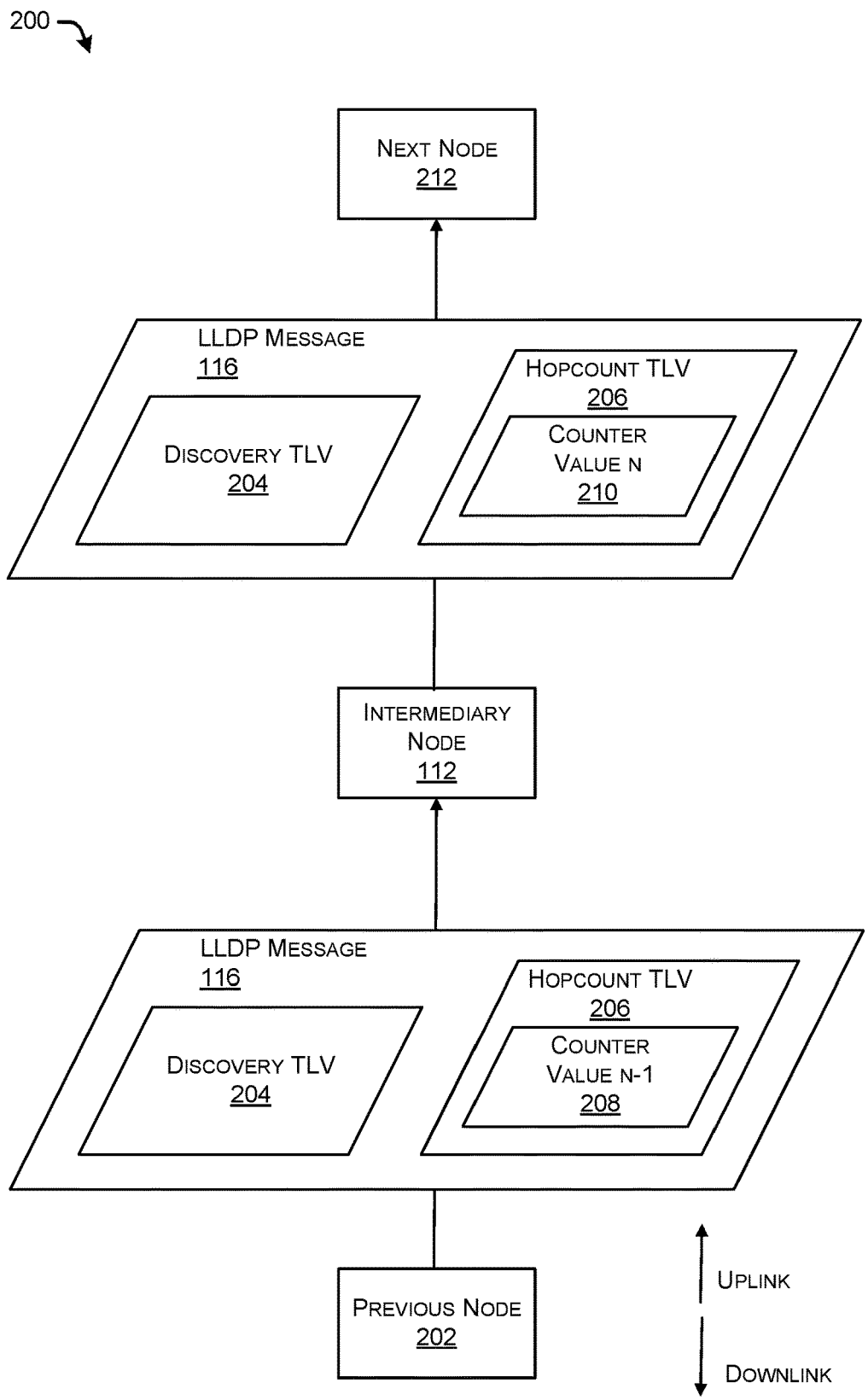
FIG. 2 illustrates example signaling associated with an intermediary node.

FIG. 2 illustrates example signaling 200 associated with an intermediary node 112, such as one of the intermediary nodes 112-1 to 112-3 described above with reference to FIG. 1. The signaling 200 relates to the relaying of a Link Layer Discovery Protocol (LLDP) message, such as the LLDP message 116, by the intermediary node 112. The intermediary node 112 may be part of a cluster network, such as the cluster network 110 described above with reference to FIG. 1.

As illustrated, the intermediary node 112 receives the LLDP message 116 from a previous node 202. The intermediary node 112 is located in an uplink direction with respect to the previous node 202. In various examples, the previous node 202 can be another intermediary node or a service node. If the previous node 202 is an intermediary node, the previous node 202 is located between the intermediary node 112 and the service node.

The LLDP message 116 may include at least two Type-Length-Value (TLV) fields: a discovery TLV 204 and a hopcount TLV. The discovery TLV 204 indicates various information about the service node from which the LLDP message 116 originated. In some cases, a value of the discovery TLV 204 can indicate at least one of a location of the service node, a type of the service node, or a capability of the service node. The discovery TLV 204 includes information that enables a network controller (e.g., the network controller 108 described above with reference to FIG. 1) to discover, monitor, and/or manage computing resources in the service node.

A value of the hopcount TLV 206 may include a counter indicating a number of remaining hops that the LLDP message 116 is designed to traverse through the cluster network. As received by the intermediary node 112, the hopcount TLV 206 includes a counter value n−1 208. The counter may be initialized by the service node. In examples in which the previous node 202 is the service node, the counter value n−1 208 may be an initial counter value. Some examples of the initial counter value can be a value ranging from 2 to 10, although implementations are not limited to these values. In some cases, the initial counter value is set based on the number of tiers in the cluster network. For instance, if the cluster network is a two-tier network, the initial counter value may be initialized at 3, to ensure that the LLDP message 116 is forwarded to at least one leaf node connected to the cluster network.

Upon receiving the LLDP message 116, the intermediary node 112 may generate a counter value n 210 based on the counter value n−1 208. In some cases, the counter value n 210 is calculated according to the following Formula 1:

$$V_n = V_{n-1} - 1$$

wherein $V_n$ is counter value n 210 and $V_{n-1}$ is counter value n−1 208. In other words, the intermediary node 112 may increment the counter value n−1 208 down by one to generate the counter value n 210.

In various implementations, the intermediary node 112 may determine whether the counter value n 210 is above a particular threshold. In some cases, the threshold may be 0, but implementations are not so limited. If the intermediary node 112 determines that the counter value n 210 is equal to or less than the threshold, the intermediary node 112 may refrain from forwarding the LLDP message 116 to the next node. However, if the intermediary node 112 determines that the counter value n 210 is greater than the threshold, the intermediary node 112 may replace the counter value n−1 208 in the hopcount TLV 206 with the counter value n 210 and forward the LLDP message 116 (with the counter value n 210) to a next node 212.

The next node 212 may be another intermediary node in the cluster network or a leaf node (e.g., leaf node 104-1 or 104-2) in a spine-leaf network (e.g., spine-leaf network 102). In examples in which the next node 212 is another intermediary node, the next node 212 may update the hopcount TLV 206 similarly to intermediary node 112, check whether the updated hopcount TLV 206 indicates that the LLDP message 116 should be forwarded, and forward or refrain from forwarding the LLDP message 116 along to another node.

In instances in which the next node 212 is a leaf node, the leaf node may at least partially forward the LLDP message 116 to a network controller (e.g., network controller 108) of the spine-leaf network. According to some examples, the leaf node may refrain from forwarding the entire LLDP message 116. However, in some cases, the leaf node may forward, to the network controller, information based at least on the value of the discovery TLV 204. For instance, the leaf node may forward at least one of a location of the service node, a type of the service node, or a capability of the service node to the network controller. The network controller may use the information in the value of the discovery TLV 204 to discover the service node, manage computing resources in the service node, and/or confirm that the service node is connected to the cluster network.

According to various implementations, the relaying of the LLDP message 116 by the intermediary node 112 can enable the spine-leaf network to discover and/or confirm the presence of the service node in the network. In addition, the process of modifying the hopcount TLV 206, confirming that the value of the hopcount TLV 206 is above a particular threshold, and forwarding the LLDP message 116 with the modified hopcount TLV 206 ensures that the LLDP message 116 is not forwarded indefinitely between intermediary nodes within the cluster network.

Figure 3:
FIG. 3 illustrates an example of a Link Layer Discovery Protocol (LLDP) message according to various implementations of the present disclosure.

FIG. 3 illustrates an example of a Link Layer Discovery Protocol (LLDP) message 300. The LLDP message 300 may be generated and transmitted by a service node and/or relayed by an intermediary node in a cluster network. As illustrated, the LLDP message 300 can include a chassis Identification (ID) Type-Length-Value (TLV), 302, a port ID TLV 304, a time to live TLV 306, a discovery TLV 308, a hopcount TLV 310, and an end of LLDP Data Unit (LLDPDU) TLV 312. The LLDP message 300 may be an LLDPDU.

The chassis ID TLV 302, the port ID TLV 304, and the time to live TLV 306 may be mandatory TLVs in the LLDP message 300. The chassis ID TLV 302 may identify the device transmitting the LLDP message 300 and may be a Type 1 mandatory TLV. In various examples, when the LLDP message 300 is relayed by an intermediary node in the cluster network, the chassis ID TLV 302 represents the service node that generated the LLDP message 300, rather than the intermediary node.

The Port ID TLV 304 may identify the port from which the LLDP message 300 is transmitted and may be a Type 2 mandatory TLV. In some examples, when the LLDP message 300 is relayed by an intermediary node in the cluster network, the port ID TLV 304 represents the service node that generated the LLDP message, rather than a port ID of the intermediary node.

The time to live TLV 306 may identify how long the receiving device should consider the information in the LLDP message 300 valid and may be a Type 3 mandatory TLV. In some cases, the time to live TLV 306 remains the same as the LLDP message 300 is relayed through the cluster network.

The discovery TLV 308 and the hopcount TLV 310 are each optional TLVs within the LLDP message 300. In some cases, the hopcount TLV 310 can be omitted from the LLDP message 300. The discovery TLV 308 may indicate at least one of a location, a type, or a capability of the service node. The hopcount TLV 310 may indicate how many remaining hops through a cluster network the LLDP message 300 should traverse. According to particular examples, one or both of the discovery TLV 308 and the hopcount TLV 310 can be a Type 127 custom TLV. For instance, at least one of the discovery TLV 308 or the hopcount TLV 310 may be an organizationally specific Type 127 TLV. In some cases, other optional TLVs may be included within the LLDP message 308. In some cases, one or both of the discovery TLV 308 and the hopcount TLV 310 can be a reserved TLV (e.g., one of Types 9-126).

The end of LLDPU TLV 312 may indicate the end of the LLDPU frame structure. The end of LLDPU TLV 312 may be a Type 0 TLV with a length of 0 and no value.

In various examples, the LLDP message 300 can be generated and transmitted periodically by the service node. For instance, the LLDP message 300 may be transmitted every minute, every 30 seconds, every 20 seconds, every 10 seconds, every 5 seconds, every 2 seconds, or the like.

FIG. 4A illustrates an example of a discovery Type-Length-Value (TLV) 400 in a Link Layer Discovery Protocol (LLDP) message that is generated by a service node. In some cases, the LLDP message can be relayed through one or more intermediary nodes in a cluster network and received by a leaf node in a spine-leaf network.

The discovery TLV 400 can include at least one of three fields: a type field, a length field, and a value field. The type field includes a TLV type 402, which may be 7-bit identifier of the type of data within the value field. In some implementations, the TLV type 402 of the discovery TLV 400 is type 127, which refers to a custom TLV. However, in some cases, the TLV type 402 is one of types 9-126. Types 9-126 are reserved TLV types.

The length field includes a TLV length 404 that identifies the length of the value field. In various examples, the TLV length 404 is represented by a 9-bit value.

The value field may include a service node identifier 406, a service node location 408, a service node type 410, and/or a service node capability 412. In some cases, the service node identifier 406, the service node location 408, the service node type 410, and/or the service node capability 412 may be collectively represented by 0-511 octets.

The service node identifier 406 may indicate an identity of the service node. For example, the service node identifier 406 may represent a domain name and/or Domain Name System (DNS) name of the service node. In some cases, the service node identifier 406 may include the service node location 408.

The service node location 408 may indicate at least one location of the service node. For instance, the service node location 408 may represent an Internet Protocol (IP) address of the service node, a Media Access Control (MAC) address of the service node, a port number associated with the service node, or the like. The service node location 408 may allow a discovering device (e.g., a network controller of the spine-leaf network) to enable communications with the service node.

The service node type 410 may indicate a type of the service node. For instance, the service node 410 may identify whether the service node is a server, a network switch, or the like. In some cases, the service node type 410 may indicate a vendor of the service node.

The service node capability 412 may indicate at least one software or hardware capability of the service node. In some cases, the service node capability 412 can indicate an available memory capacity of the service node, a processing capability of the service node, an operating system running on the service node, or the like.

FIG. 4B illustrates another example of a discovery Type-Length-Value (TLV) 414 in a Link Layer Discovery Protocol (LLDP) message that is generated by a service node. In some cases, the LLDP message can be relayed through one or more intermediary nodes in a cluster network and received by a leaf node in a spine-leaf network. The discovery TLV 414 may be a custom type 127 TLV. The discovery TLV 414 can include multiple fields: a type field, a length field, and a value field that comprises an organizationally unique identifier, an organizationally defined subtype, and an organizationally defined information string.

The type field includes a TLV type 416, which may be 7-bit identifier of the type of data within the value field. In the implementation illustrated in FIG. 4B, the TLV type 416 of the discovery TLV 414 is type 127, which is a custom TLV.

The length field includes a TLV length 418 that identifies the length of the value field. That is, the TLV length 418 can represent a total length of the organizationally unique identifier, the organizationally defined subtype, and the organizationally defined information string. In various examples, the TLV length 418 is represented by a 9-bit value.

The organizationally unique identifier may specify an identifier 420. The identifier 420 may identify an organization using the organization's organizationally unique identifier as defined in IEEE Std. 802-2001. The identifier 420 may have a length of 24 bits.

The organizationally defined subtype may specify a subtype 422. The subtype 422 may identify the discovery TLV 414 among various TLVs utilized by the organization. In some cases, the subtype 422 may have a length of 8 bits.

The organizationally defined information string may include a service node identifier 424, a service node location 426, a service node type 428, and/or a service node capability 430. In some cases, the service node identifier 424, the service node location 426, the service node type 428, and/or the service node capability 430 may be collectively represented by 0-507 octets.

The service node identifier 424 may indicate an identity of the service node. For example, the service node identifier 424 may represent a domain name and/or Domain Name System (DNS) name of the service node. In some cases, the service node identifier 424 may include the service node location 426.

The service node location 426 may indicate at least one location of the service node. For instance, the service node location 426 may represent an Internet Protocol (IP) address of the service node, a Media Access Control (MAC) address of the service node, a port number associated with the service node, or the like. The service node location 426 may allow a discovering device (e.g., a network controller of the spine-leaf network) to enable communications with the service node.

The service node type 428 may indicate a type of the service node. For instance, the service node type 428 may identify whether the service node is a server, a network switch, or the like. In some cases, the service node type 428 may indicate a vendor of the service node.

The service node capability 430 may indicate at least one software or hardware capability of the service node. In some cases, the service node capability 430 can indicate an available memory capacity of the service node, a processing capability of the service node, an operating system running on the service node, or the like.

FIG. 5A illustrates an example of a hopcount Type-Length-Value (TLV) 500 in a Link Layer Discovery Protocol (LLDP) message that is generated by a service node. In some cases, the LLDP message can be relayed through one or more intermediary nodes in a cluster network and received by a leaf node in a spine-leaf network. When an intermediary node relays the LLDP message, the intermediary node may modify the hopcount TLV 500.

The hopcount TLV 500 can include at least one of three fields: a type field, a length field, and a value field. The type field includes a TLV type 502, which may be 7-bit identifier of the type of data within the value field. In some implementations, the TLV type 502 of the hopcount TLV 500 is type 127, which refers to a custom TLV. However, in some cases, the TLV type 502 is one of types 9-126. Types 9-126 are reserved TLV types.

The length field includes a TLV length 504 that identifies the length of the value field. In various examples, the TLV length 504 is represented by a 9-bit value.

The value field may include a counter 506. The counter 506 may represent a number of remaining hops that the LLDP message can traverse through the network. In some cases, the counter 506 may have an integer value ranging from 0 to 10. The counter 506 may be initialized by the service node. In some cases, an initial value of the counter 506 may depend on the number of tiers within the cluster network. For instance, the initial value of the counter 506 may be equal to or greater than the number of tiers within the cluster network. In some examples, the counter 506 may be initialized at a value of 2 to 10. The counter 506 may be modified each time an intermediary node relays the LLDP message in the cluster network. In some cases, a relaying intermediary node may increment the counter 506 down by one upon receiving the LLDP message. In various implementations, the counter 506 can be represented by 0-511 octets.

FIG. 5B illustrates another example of a hopcount Type-Length-Value (TLV) 508 in a Link Layer Discovery Protocol (LLDP) message that is generated by a service node. In some cases, the LLDP message can be relayed through one or more intermediary nodes in a cluster network and received by a leaf node in a spine-leaf network. When an intermediary node relays the LLDP message, the intermediary node may modify the hopcount TLV 508.

The hopcount TLV 508 can include multiple fields: a type field, a length field, and a value field that includes an organizationally unique identifier field, an organizationally defined subtype field, and an organizationally defined information string field. The type field includes a TLV type 510, which may be 7-bit identifier of the type of data within the value field. In some implementations, the TLV type 510 of the hopcount TLV 508 is type 127, which refers to a custom TLV.

The length field includes a TLV length 512 that identifies the length of the value field. In various examples, the TLV length 512 is represented by a 9-bit value.

The organizationally unique identifier may specify an identifier 514. The identifier 514 may identify an organization using the organization's organizationally unique identifier as defined in IEEE Std. 802-2001. The identifier 514 may have a length of 24 bits.

The organizationally defined subtype may specify a subtype 516. The subtype 516 may identify the hopcount TLV 508 among various TLVs utilized by the organization. In some cases, the subtype 516 may have a length of 8 bits.

The information string field may include a counter 506. The counter 506 may represent a number of remaining hops that the LLDP message can traverse through the network. In some cases, the counter 506 may have an integer value ranging from 0 to 10. The counter 506 may be initialized by the service node. In some cases, an initial value of the counter 506 may depend on the number of tiers within the cluster network. For instance, the initial value of the counter 506 may be equal to or greater than the number of tiers within the cluster network. In some examples, the counter 506 may be initialized at a value of 2 to 10. The counter 506 may be modified each time an intermediary node relays the LLDP message in the cluster network. In some cases, a relaying intermediary node may increment the counter 506 down by one upon receiving the LLDP message. In various implementations, the counter 506 can be represented by 0-511 octets.

FIGS. 6 to 9 illustrate various processes associated with implementations of the present disclosure.

Figure 6:
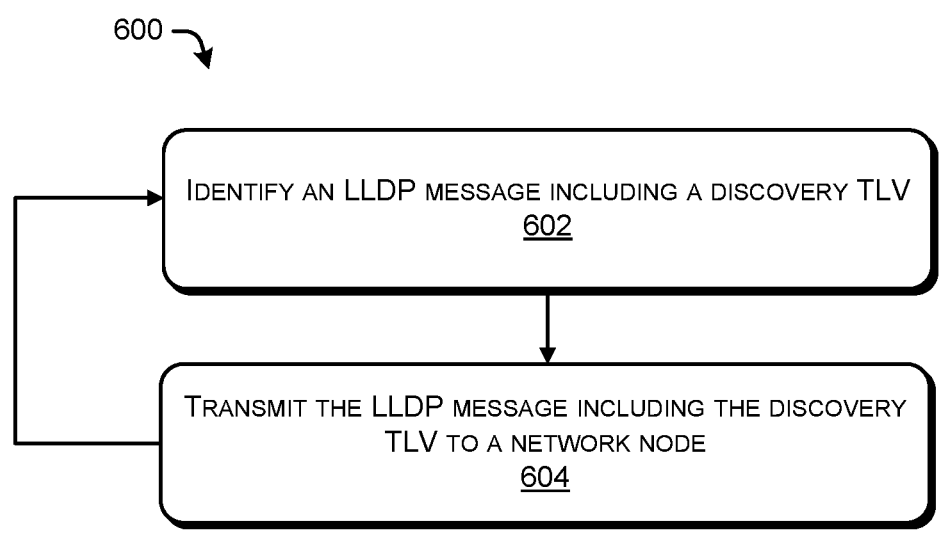
FIG. 6 illustrates an example process for forwarding LLDP messages.

FIG. 6 illustrates an example process 600 for forwarding Link Layer Discovery Protocol (LLDP) messages. In various implementations, process 600 can be performed by a service node (e.g., the service node 114 described above with reference to FIG. 1), an intermediary node (e.g., any of the intermediary nodes 112, 112-1, 112-2, or 112-3 described above with reference to FIGS. 1 and 2), or the like.

At 602, an LLDP message including a discovery Type-Length-Value (TLV) is identified. In some examples in which the process 600 is performed by a service node in a cluster network, 602 may include generating the LLDP message with the discovery TLV. In various examples in which the process 600 is performed by an intermediary node in the cluster network, 602 may include receiving the LLDP message from the service node or another intermediary node in the cluster network.

The discovery TLV may be a specific TLV that indicates information about the service node. In various implementations, the discovery TLV may indicate at least one of a service node identifier, a service node location, a service node type, or a service node capability. In some implementations, the discovery TLV is a Type 127 custom TLV. In some cases, the LLDP message may also include a hopcount TLV.

At 604, the LLDP message including the discovery TLV is transmitted to a network node. In some implementations in which the process 600 is performed by an intermediary node, one or more elements in the LLDP message may be modified before the LLDP message is transmitted at 604. However, regardless of whether the process 600 is performed by a service node, an intermediary node, or the like, the discovery TLV may be unmodified.

In various implementations, 602 and 604 can be repeated. For instance, a service node may periodically generate an LLDP message with the discovery TLV. An intermediary node may periodically receive the LLDP message from the service node or from another intermediary node in the cluster network.

Figure 7:
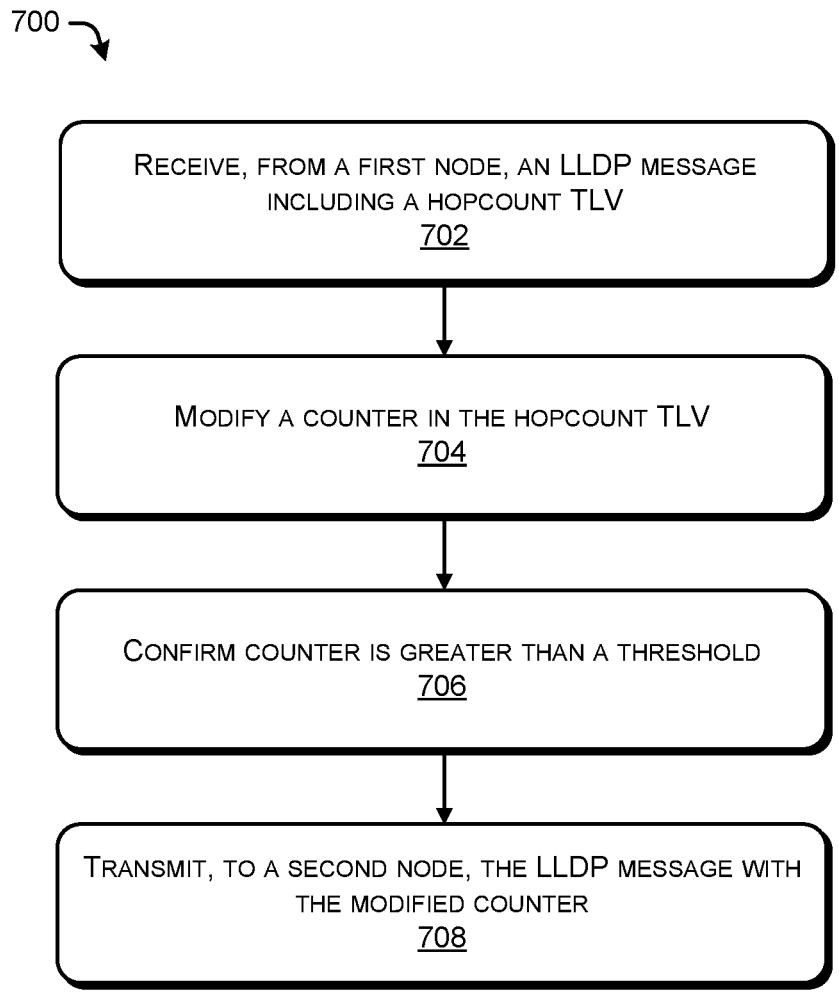
FIG. 7 illustrates an example process for relaying an LLDP message.

FIG. 7 illustrates an example process 700 for relaying a Link Layer Discovery Protocol (LLDP) message. In various implementations, process 700 can be performed by an intermediary node (e.g., any of the intermediary nodes 112, 112-1, 112-2, or 112-3 described above with reference to FIGS. 1 and 2), or the like.

At 702, the LLDP message is received from a first node. The LLDP message includes a hopcount TLV. The first node may be a service node, an intermediary node, or the like in a cluster network. In various implementations, the hopcount TLV may be a specific TLV that includes a counter. The counter may specify an integer representing a number of remaining hops that the LLDP message can traverse through a cluster network. In some cases, the hopcount TLV is a Type 127 custom TLV.

In some cases, the LLDP message may further include a discovery TLV. The discovery TLV may be a specific TLV that indicates information about the service node in the cluster network. In various implementations, the discovery TLV may indicate at least one of a service node identifier, a service node location, a service node type, or a service node capability. In some implementations, the discovery TLV is a Type 127 custom TLV At 704, the counter is modified. In some cases, the counter can be incremented down by one, which may represent the previous hop from the first node to the entity performing the process 700.

At 706, the counter is confirmed to be greater than a threshold. In some cases, the threshold is a predetermined integer, such as zero. If the counter is not greater than the threshold, then the LLDP message may be discarded and not forwarded. However, if the counter is determined to be greater than the threshold, the LLDP message may be forwarded to another node.

At 708, the LLDP message is transmitted to a second node with the modified counter. In some cases, the second node can be an intermediary node in the cluster network. In certain instances, the second node can be a leaf node in a spine-leaf network.

Figure 8:
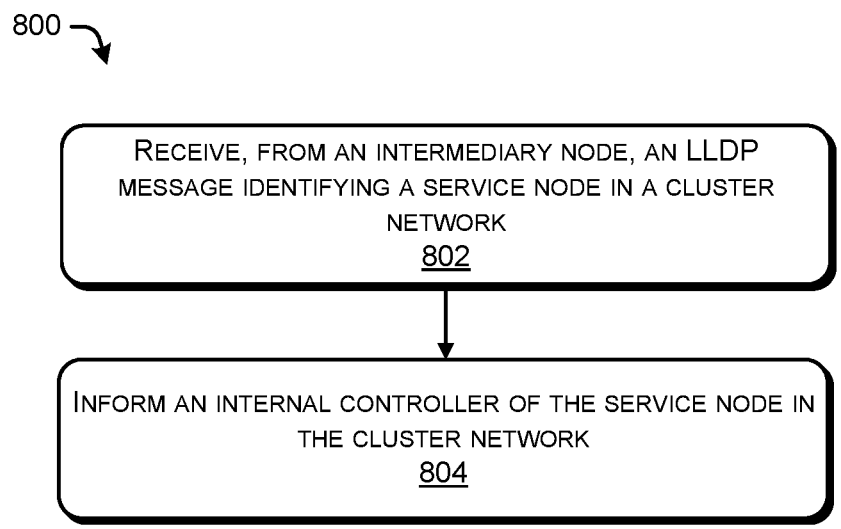
FIG. 8 illustrates an example process by which a node in a spine-leaf network can discover and/or confirm the presence of a service node in a cluster network connected to the spine-leaf network.

FIG. 8 illustrates an example process 800 by which a node in a spine-leaf network can discover and/or confirm the presence of a service node in a cluster network connected to the spine-leaf network. In various implementations, the process 800 can be performed by a leaf node (e.g., leaf node 104-1, 104-2, or 104-3 described above with reference to FIG. 1).

At 802, a Link Layer Discovery Protocol (LLDP) message identifying a service node in a cluster network is received from an intermediary node in the cluster network. The LLDP message may include a discovery Type Length Value (TLV). The discovery TLV may be a specific TLV that indicates information about the service node in the cluster network. In various implementations, the discovery TLV may indicate at least one of a service node identifier, a service node location, a service node type, or a service node capability. In some implementations, the discovery TLV is a Type 127 custom TLV.

At 804, a network controller is informed of the service node in the cluster network. In some cases, the network controller is a Software Defined Network (SDN) controller that is connected to the entity performing the process 800 by one or more interfaces. The network controller can be represented in software, hardware, or a combination thereof. In some cases, a packet indicating information within the discovery TLV can be transmitted to the network controller. However, in various implementations, the entity performing the process 800 (e.g., the leaf node) may refrain from forwarding the entire LLDP message to the network controller. For instance, the packet transmitted to the network controller can indicate at least one of the service node identifier, the service node location, the service node type, or the service node capability. The packet may, in some instances, be forwarded according to proprietary packet-based and/or control-path mechanisms. In some cases, the packet can further identify the entity performing the process 800. For instance, if process 800 is performed by a leaf node, the packet can identify the leaf node.

Figure 9:
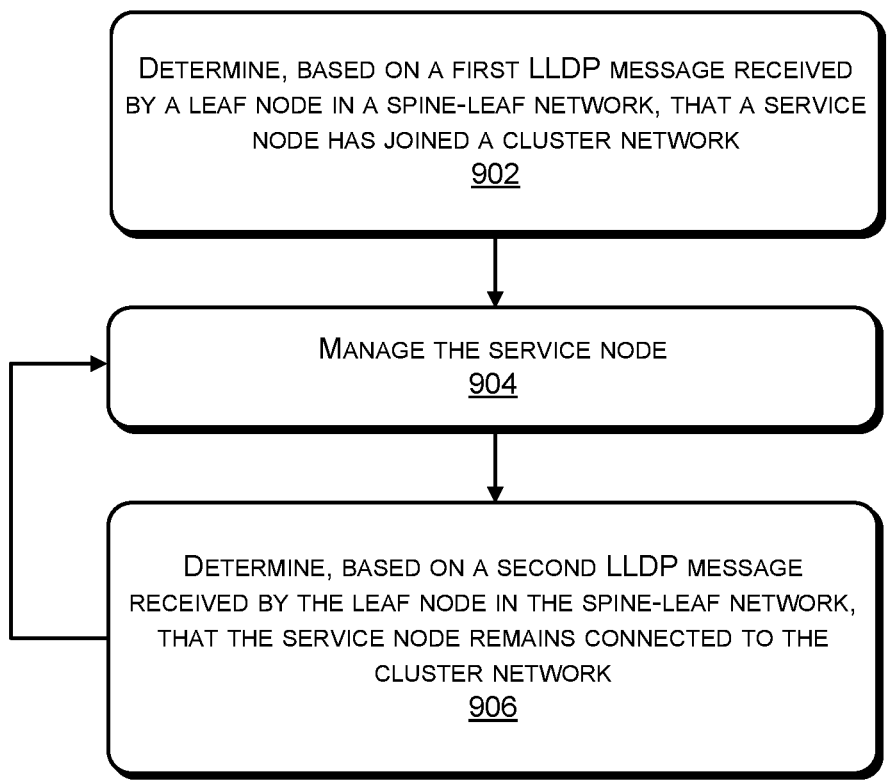
FIG. 9 illustrates an example process by which a network controller in a spine-leaf network can discover and monitor a service node.

FIG. 9 illustrates an example process 900 by which a network controller in a spine-leaf network can discover and monitor a service node. In various implementations, the process 900 can be performed by a controller, such as the network controller 108 described above with reference to FIG. 1.

At 902, a service node is determined to have joined a cluster network based on a first Link Layer Discovery Protocol (LLDP) message received by a leaf node in a spine-leaf network. In various implementations, the entity performing process 900 may be part of the spine-leaf network, connected to the spine-leaf network, or the like. Upon receiving the first LLDP message, the leaf node may transmit, to the entity performing process 900, a message indicating the first LLDP message. The message may indicate, for example, at least one of an identifier of a service node that generated the first LLDP message, a location of the service node, a type of the service node, or a capability of the service node. The message may further identify the leaf node. In some cases, the first LLDP message is generated by the service node in response to the service node connecting to a cluster network, which is connected to the spine-leaf network. Accordingly, the service node may be connected to the spine-leaf network.

At 904, the service node is managed. In various implementations, the entity performing the process 900 can manage computing resources in the service node. For instance, the entity may control, store, manage, extract, or delete data in the computing resources. The computing resources may include Virtual Machine (VM) instances or hardware computing systems, database clusters, computing clusters, storage clusters, data storage resources, database resources, networking resources, or the like. In some implementations, the entity may communicate with the service node using the leaf node. In various examples, the service node can be managed by updating a network configuration of the spine-leaf network. For instance, various Virtual Local Area Networks (VLANs) (or other network policies) can be activated on leaf and/or intermediary nodes.

At 906, the service node is determined to remain connected to the network based on a second LLDP message received by the leaf node in the spine-leaf network. In various implementations, the service node may generate and transmit second LLDP messages periodically when the service node is connected to the spine-leaf network. Accordingly, the leaf node may receive multiple second LLDP messages indicating that the service node remains connected to the spine-leaf network. The leaf node may forward messages to the entity performing the process 900 indicating that the service node remains connected to the spine-leaf network. Accordingly, the process 900 may loop back to 904, such that the service node is managed as long as the service node is determined to remain connected to the spine-leaf network.

Figure 10:
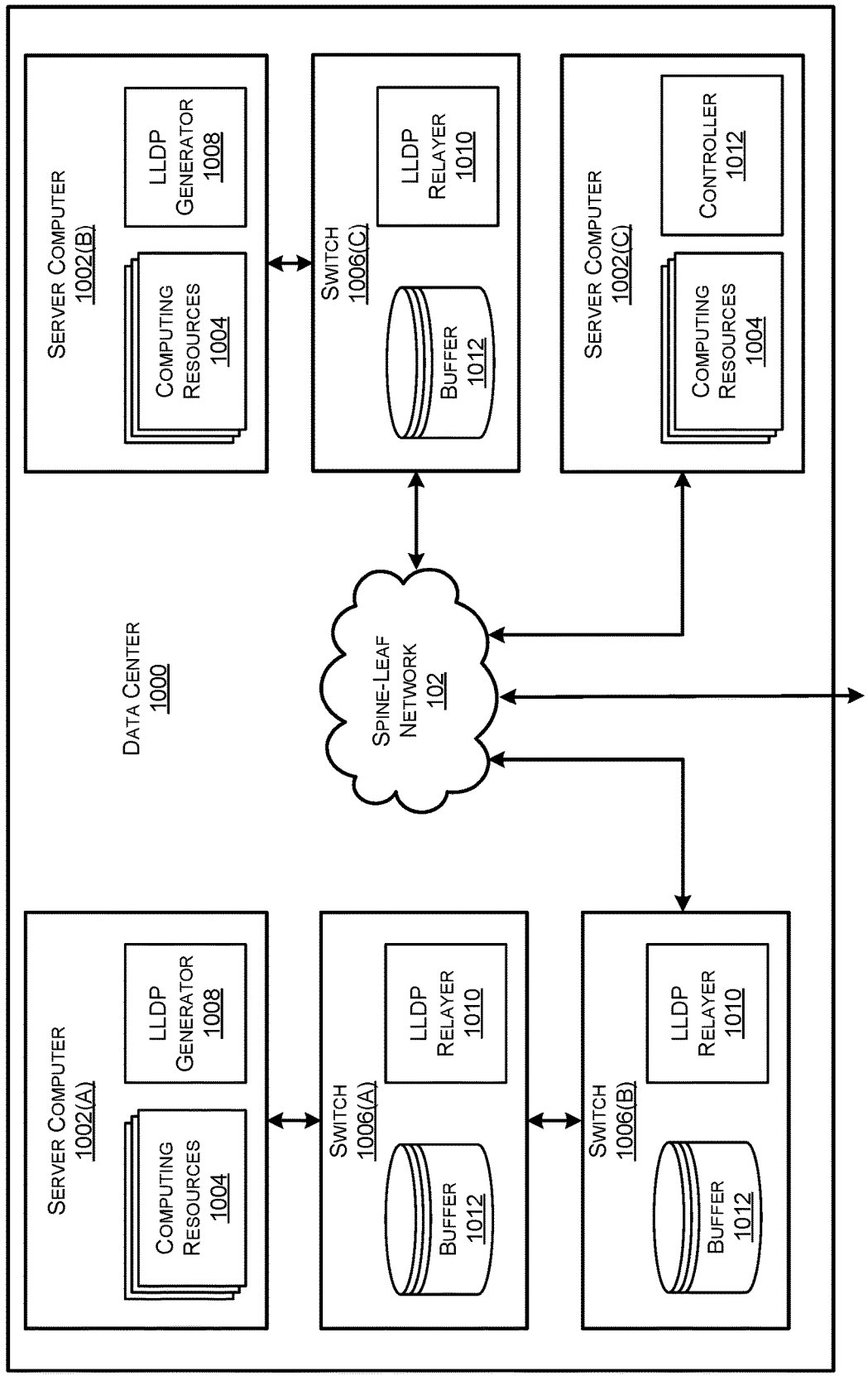
FIG. 10 is a computing system diagram illustrating a configuration for a data center that can be utilized to implement aspects of the technologies disclosed herein.

FIG. 10 is a computing system diagram illustrating a configuration for a data center 1000 that can be utilized to implement aspects of the technologies disclosed herein. The example data center 1000 shown in FIG. 10 includes several server computers 1002A-1002C (which might be referred to herein singularly as "a server computer 1002" or in the plural as "the server computers 1002") for providing computing resources 1004. In some examples, the resources 1004 and/or server computers 1002 may include, or correspond to, the service nodes (e.g., service node 114) described herein.

The server computers 1002 can be standard tower, rackmount, or blade server computers configured appropriately for providing the computing resources described herein. The computing resources 1004 can be data processing resources such as VM instances or hardware computing systems, database clusters, computing clusters, storage clusters, data storage resources, database resources, networking resources, and others. Some or all of the server computers 1002 can also be configured to execute a resource manager capable of instantiating and/or managing the computing resources. In the case of VM instances, for example, the resource manager can be a hypervisor or another type of program configured to enable the execution of multiple VM instances on a single server computer 1002. Server computers 1002 in the data center 1000 can also be configured to provide network services and other types of services.

In the example data center 1000, an appropriate Local Area Network (LAN) including the spine-leaf network 102 and switches 1006A-1006C are also utilized to interconnect the server computers 1002A-1002C. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 1000, between each of the server computers 1002A-1002C in each data center 1000, and, potentially, between computing resources in each of the server computers 1002. It should be appreciated that the configuration of the data center 1000 described with reference to FIG. 10 is merely illustrative and that other implementations can be utilized.

As illustrated in FIG. 7, some of the server computers 1002 (e.g., server computers 1002A and 1002B) may each execute an Link Layer Discovery Protocol (LLDP) generator 1008 configured to generate LLDP messages. Each of the LLDP messages may include a discovery Type-Length-Value (TLV) field and/or a hopcount TLV field. The server computers 1002 may transmit the generated LLDP messages toward the switches 1006.

Further, each of the switches 1006 may execute an LLDP relayer 1010. Using the LLDP relayer 1010, the switches 1006 may relay the LLDP messages from the server computers 1002 toward the spine-leaf network 102. In some cases, the switches 1006 may modify the hopcount TLV field in each of the relayed LLDP messages. The switches 1006 may also respectively include buffers 1012. The buffers 1012 may be used to temporarily store data packets that the switches 1006 forward between the server computers 1002 and the spine leaf network 102.

At least one of the server computers 1002 (e.g., server computer 1102C) may further execute a controller 1012. The controller 1012 may be responsible for managing the spine leaf network 102 and/or the computing resources 1004 in the server computers 1002. When the spine-leaf network 102 receives the LLDP messages generated by the server computers 1002 and forwarded by the switches 1006, the spine-leaf network 102 may forward a message to the server computer 1002C executing the controller 1012. The controller 1012 may discover and/or confirm the presence of the server computers 1002 by receiving messages from the spine-leaf network 102.

In some instances, the computing resources 1004 may provide application containers, VM instances, and storage, or the like, on a permanent or an as-needed basis. Among other types of functionality, the computing resources 1004 may be utilized to implement the various services described above. The computing resources can include various types of computing resources, such as data processing resources like application containers and VM instances, data storage resources, networking resources, data communication resources, network services, and the like.

Each type of computing resource 1004 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The data center 1000 can also be configured to provide other types of computing resources not mentioned specifically herein.

The computing resources 1004 may be enabled in one embodiment by one or more data centers 1000 (which might be referred to herein singularly as "a data center 1000" or in the plural as "the data centers 1000"). The data centers 1000 are facilities utilized to house and operate computer systems and associated components. The data centers 1000 typically include redundant and backup power, communications, cooling, and security systems. The data centers 1000 can also be located in geographically disparate locations.

Figure 11:
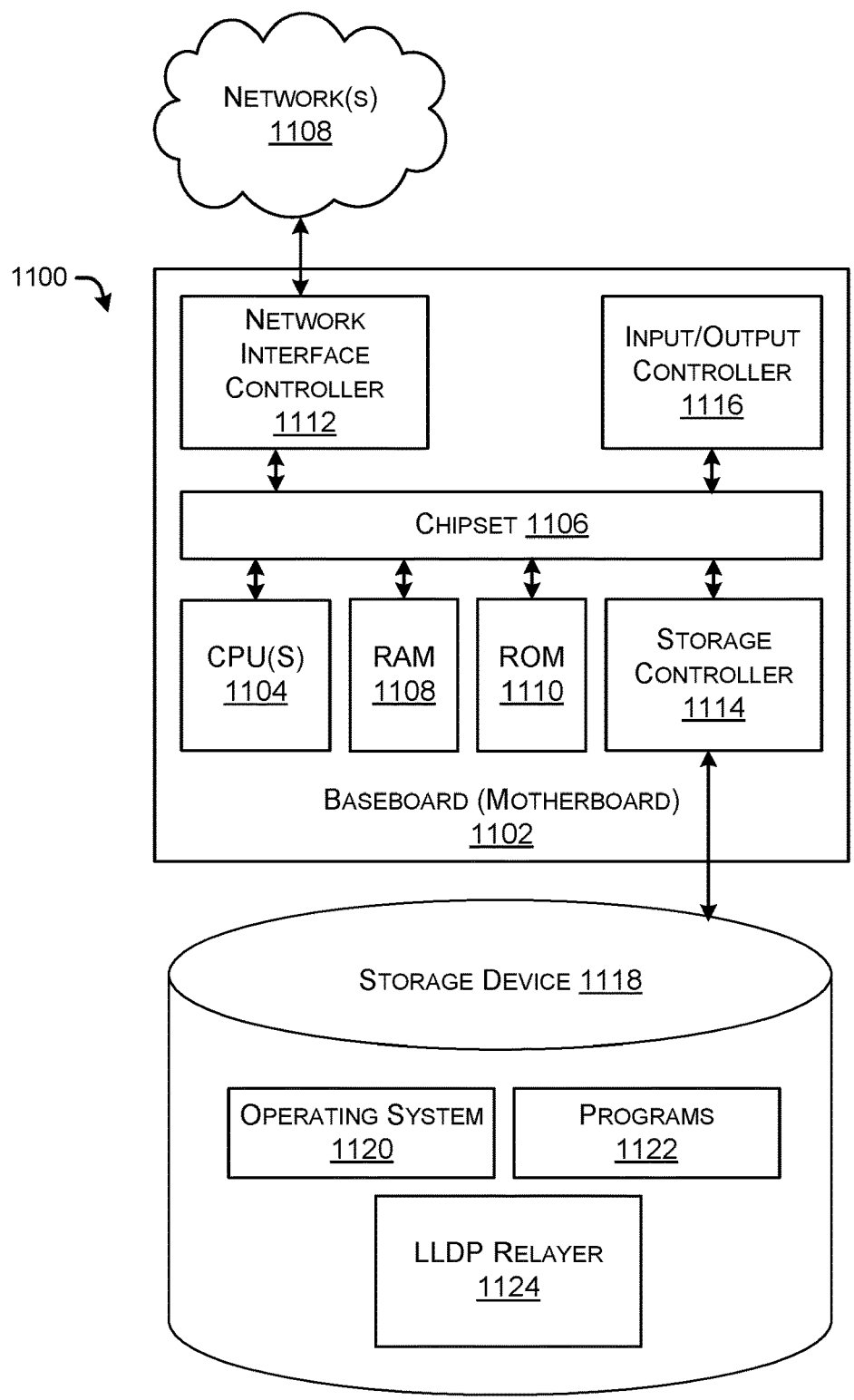
FIG. 11 shows an example computer architecture for a computer capable of executing program components for implementing the functionality described above.

FIG. 11 shows an example computer architecture for a computer 1100 capable of executing program components for implementing the functionality described above. The computer architecture shown in FIG. 11 illustrates a conventional server computer, workstation, desktop computer, laptop, tablet, network appliance, e-reader, smartphone, network switch, or other computing device, and can be utilized to execute any of the software components presented herein. The computer 1100 may, in some examples, correspond to a network node (e.g., a service node 114, an intermediary node 112, a leaf node 104, or the like) described herein.

The computer 1100 includes a baseboard 1102, or "motherboard," which is a printed circuit board to which a multitude of components or devices can be connected by way of a system bus or other electrical communication paths. In one illustrative configuration, one or more central processing units ("CPUs") 1104 operate in conjunction with a chipset 1106. The CPUs 1104 can be standard programmable processors that perform arithmetic and logical operations necessary for the operation of the computer 1100.

The CPUs 1104 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 can provide an interface to a RAM 1108, used as the main memory in the computer 1100. The chipset 1106 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1110 or NVRAM can also store other software components necessary for the operation of the computer 1100 in accordance with the configurations described herein.

The computer 1100 can operate in a networked environment using logical connections to remote computing devices and computer systems through a network, such as the network 1108. The chipset 1106 can include functionality for providing network connectivity through a Network Interface Controller (NIC) 1112, such as a gigabit Ethernet adapter. The NIC 1112 is capable of connecting the computer 1100 to other computing devices over the network 1108. It should be appreciated that multiple NICs 1112 can be present in the computer 1100, connecting the computer to other types of networks and remote computer systems. In some instances, the NICs 1112 may include at least on ingress port and/or at least one egress port.

The computer 1100 can be connected to a storage device 1118 that provides non-volatile storage for the computer. The storage device 1118 can store an operating system 1120, programs 1122, and data, which have been described in greater detail herein. The storage device 1118 can be connected to the computer 1100 through a storage controller 1114 connected to the chipset 1106. The storage device 1118 can consist of one or more physical storage units. The storage controller 1114 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1100 can store data on the storage device 1118 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1118 is characterized as primary or secondary storage, and the like.

For example, the computer 1100 can store information to the storage device 1118 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1100 can further read information from the storage device 1118 by detecting the physical states or characteristics of one or more particular locations within the physical storage units.

In addition to the mass storage device 1118 described above, the computer 1100 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1100. In some examples, the operations performed by a leaf node (e.g., 104), a spine node (e.g., 106), a controller (e.g., network controller 108), an intermediary node (e.g., 112), a service node (e.g., 114), a previous node (e.g., 202), a next node (e.g., 212), or a combination thereof, may be supported by one or more devices similar to computer 1100. Stated otherwise, some or all of the operations performed by leaf node, a spine node, a controller, an intermediary node, a service node, a previous node, a next node, or the like, may be performed by one or more computer devices 1100 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1118 can store an operating system 1120 utilized to control the operation of the computer 1100. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 1118 can store other system or application programs and data utilized by the computer 1100.

In one embodiment, the storage device 1118 or other computer-readable storage media is encoded with computer-executable instructions which, when loaded into the computer 1100, transform the computer from a general-purpose computing system into a special-purpose computer capable of implementing the embodiments described herein. These computer-executable instructions transform the computer 1100 by specifying how the CPUs 1104 transition between states, as described above. According to one embodiment, the computer 1100 has access to computer-readable storage media storing computer-executable instructions which, when executed by the computer 1100, perform the various processes described above with regard to FIGS. 1-10. The computer 1100 can also include computer-readable storage media having instructions stored thereupon for performing any of the other computer-implemented operations described herein.

As illustrated in FIG. 11, the storage device 1118 also stores a Link Layer Discovery Protocol (LLDP) relayer 1124. In some implementations, the LLDP relayer 1124 can be omitted. Using instructions stored in the LLDP relayer 1124, the CPU(s) 1104 may cause the computer 1100 to relay an LLDP message generated by a service node toward a leaf node.

The computer 1100 can also include one or more input/output controllers 1016 for receiving and processing input from a number of input devices, such as a keyboard, a mouse, a touchpad, a touch screen, an electronic stylus, or other type of input device. Similarly, an input/output controller 1116 can provide output to a display, such as a computer monitor, a flat-panel display, a digital projector, a printer, or other type of output device. It will be appreciated that the computer 1100 might not include all of the components shown in FIG. 11, can include other components that are not explicitly shown in FIG. 11, or might utilize an architecture completely different than that shown in FIG. 11.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on."

As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method, comprising:
   receiving, from a first node in a network, a Link Layer Discovery Protocol (LLDP) message comprising:
      a discovery Type-Length-Value (TLV) that indicates an identifier of a service node in the network, and
      a hopcount TLV comprising a counter;
   decreasing the counter in the hopcount TLV;
   in response to decreasing the counter, confirming that the counter is greater than zero; and
   forwarding, to a second node in the network, the LLDP message.

2. The method of claim 1, wherein the discovery TLV is a type 127 TLV with a value indicating the identifier of the service node, and
   wherein the hopcount TLV is a type 127 TLV with a value comprising the counter.

3. The method of claim 1, wherein the first node is the service node.

4. The method of claim 1, wherein the second node is a leaf node in a spine-leaf network.

5. The method of claim 1, wherein at least one of the first node or the second node comprises an intermediary node in a cluster network.

6. The method of claim 1, wherein the identifier of the service node comprises at least one of an Internet Protocol (IP) address of the service node, a Media Access Control (MAC) address of the service node, or a Domain Name Service (DNS) name of the service node.

7. The method of claim 1, wherein the discovery TLV further comprises at least one of a type of the service node, a memory capacity of the service node, or a processing capability of the service node.

8. The method of claim 1, wherein the LLDP message is a first LLDP message, the operations further comprising:
   upon expiration of a predetermined period after transmitting the first LLDP message to the second node, transmitting a second LLDP message indicating the identifier of the service node to the intermediary node.

9. The method of claim 1, wherein at least one of the first node or the second node is comprised in a cluster network.

10. A service node, comprising:
    at least one processor; and
    memory storing instructions that, when executed by the at least one processor, cause the processor to perform operations comprising:
       generating a first Link Layer Discovery Protocol (LLDP) message comprising a discovery Type-Length-Value (TLV) that indicates an identifier of the service node; and
       transmitting the first LLDP message to an intermediary node; and
       upon expiration of a predetermined period after transmitting the first LLDP message to the intermediary node, transmitting a second LLDP message indicating the identifier of the service node to the intermediary node.

11. The service node of claim 10, wherein the operations further comprise:
    connecting to the intermediary node,
    wherein transmitting the first LLDP message is in response to connecting to the intermediary node.

12. The service node of claim 10, wherein the first LLDP message further comprises a hopcount TLV that comprises a counter.

13. The service node of claim 12, wherein the discovery TLV is a type 127 TLV with a value indicating the address of the service node, and
    wherein the hopcount TLV is a type 127 TLV with a value comprising the counter.

14. The service node of claim 10, wherein the identifier of the service node comprises at least one of an Internet Protocol (IP) address of the service node, a Media Access Control (MAC) address of the service node, or a Domain Name Service (DNS) name of the service node.

15. The service node of claim 10, wherein the discovery TLV further comprises at least one of a type of the service node, a memory capacity of the service node, or a processing capability of the service node.

16. An intermediary node in a cluster network, the intermediary node comprising:
 at least one processor; and
 memory storing instructions that, when executed by the at least one processor, cause the at least one processor to perform operations comprising:
  receiving, from a previous node in the cluster network, a Link Layer Discovery Protocol (LLDP) message comprising a discovery Type-Length-Value (TLV) and a hopcount TLV, the discovery TLV comprising an identifier of a service node in the network, the hopcount TLV comprising a counter;
  decreasing the counter in the hopcount TLV;
  in response to decreasing the counter, confirming that the counter is greater than zero; and
  forwarding the LLDP message to at least one next node.

17. The intermediary node of claim 16, wherein the previous node in the cluster network is the service node or another intermediary node in the cluster network.

18. The intermediary node of claim 16, wherein the at least one next node comprises at least one of another intermediary node in the cluster network or a leaf node in in a spine-leaf network.

19. The intermediary node of claim 16, wherein the intermediary node is disposed between the previous node in the cluster network and a leaf node in a spine-leaf network.

20. The intermediary node of claim 16, wherein the discovery TLV is a type 127 TLV with a value indicating the address of the service node, and
 wherein the hopcount TLV is a type 127 TLV with a value comprising the counter.

* * * * *